United States Patent [19]

Gilb

[11] 4,291,996
[45] Sep. 29, 1981

[54] POSITIVE NAIL ANGLING DEVICE FOR METAL CONNECTORS

[75] Inventor: Tyrell T. Gilb, Berkeley, Calif.

[73] Assignee: Simpson Manufacturing Co., Inc., San Leandro, Calif.

[21] Appl. No.: 165,202

[22] Filed: Jul. 1, 1980

[51] Int. Cl.³ .............................................. F16B 9/00
[52] U.S. Cl. .................................... 403/14; 403/232.1
[58] Field of Search ............... 403/232.1, 14; 248/547, 248/489

[56] References Cited

U.S. PATENT DOCUMENTS

| 1,406,723 | 2/1922 | Caldwell | 403/232.1 |
| 3,345,029 | 10/1967 | Palmer | 248/547 X |
| 3,752,512 | 8/1973 | Gilb | 403/232.1 X |

FOREIGN PATENT DOCUMENTS

| 451766 | 9/1973 | France | 248/489 |
| 33356 | 6/1910 | Sweden | 248/489 |
| 36947 | 4/1914 | Sweden | 248/489 |

*Primary Examiner*—Andrew V. Kundrat
*Attorney, Agent, or Firm*—James R. Cypher

[57] ABSTRACT

A positive nail-angling device for metal connectors for prevention of splitting due to beam "hanging" caused by side nailing and wood shrinkage and prevention of splitting of laminated members such as plywood, glued laminated timbers (glulam) and prefabricated wood joists (microlams). The device includes a slot-like opening formed in the face of a metal connector and a tab-like member formed from the displaced face material from the slot-like opening and bent along a bend line which constitutes one end of the slot-like opening. The slot-like opening and tab-like member in the connector confine the nail so that it can only penetrate the wood member at a pre-selected angle. In many applications, the tab-like member is bent at an angle of 45° to the face of the metal connector.

4 Claims, 10 Drawing Figures

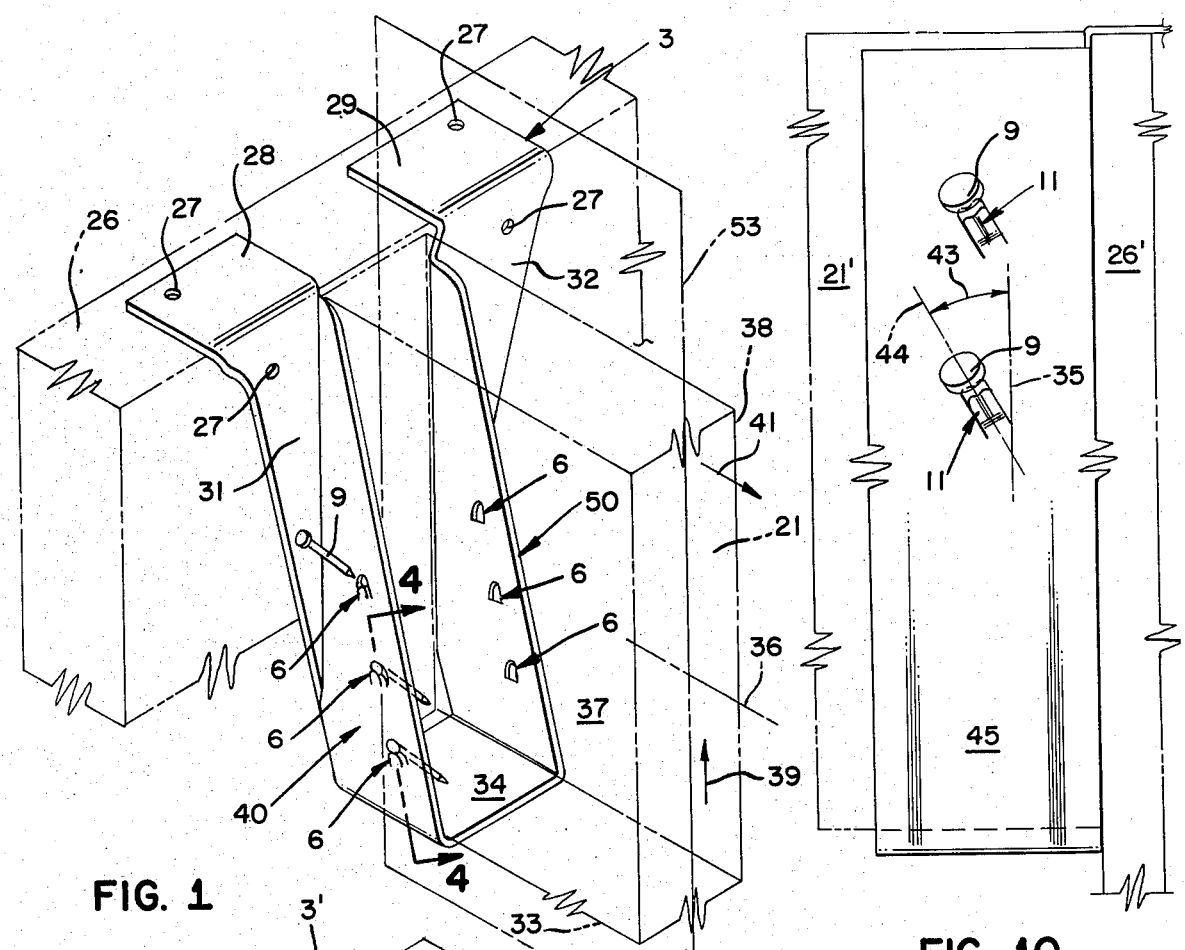
FIG. 1
FIG. 10
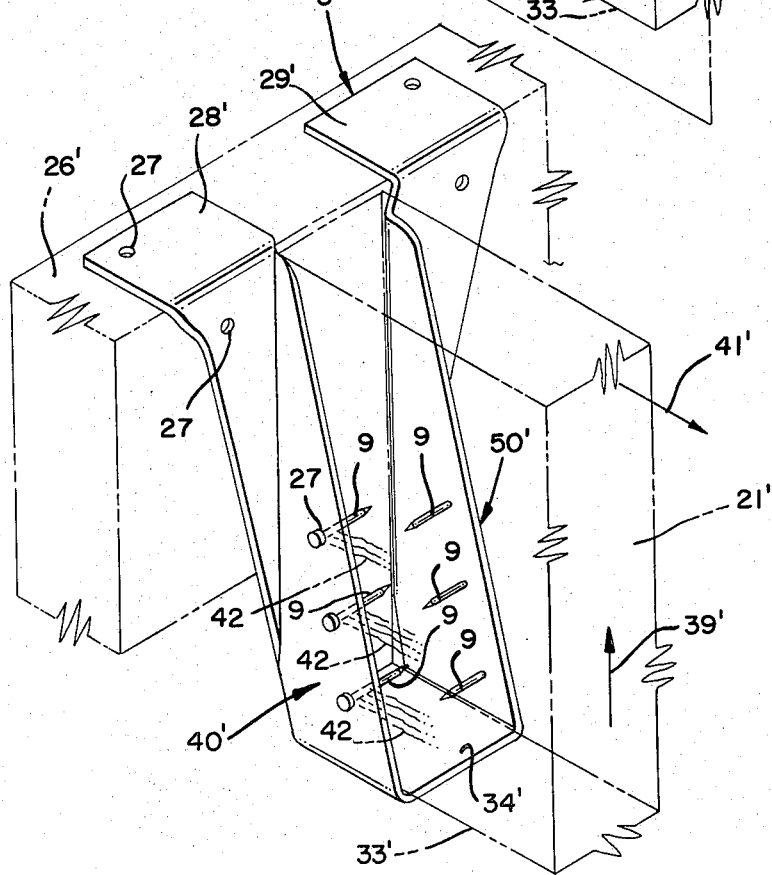
FIG. 2
(PRIOR ART)

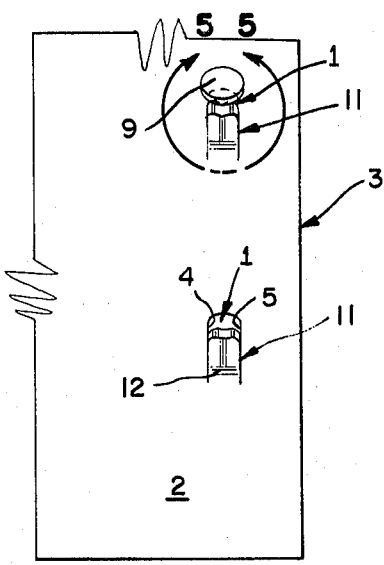
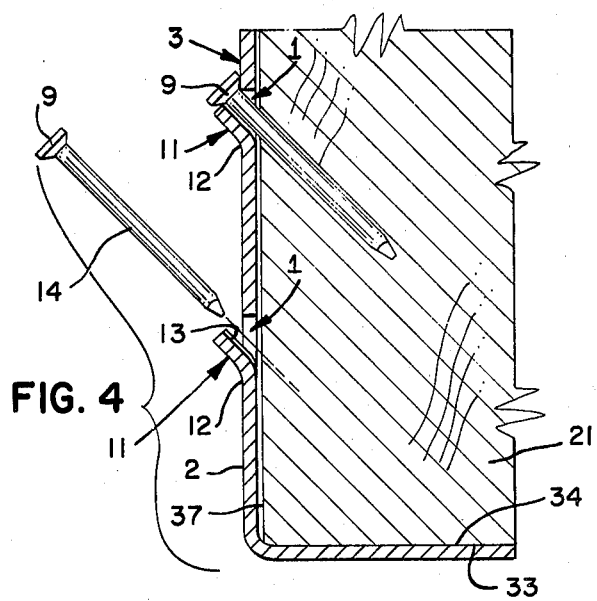
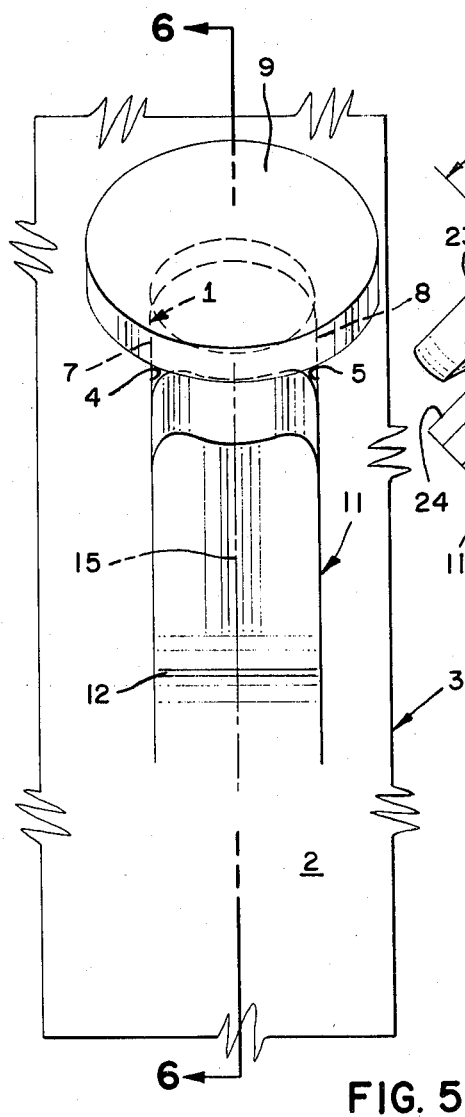
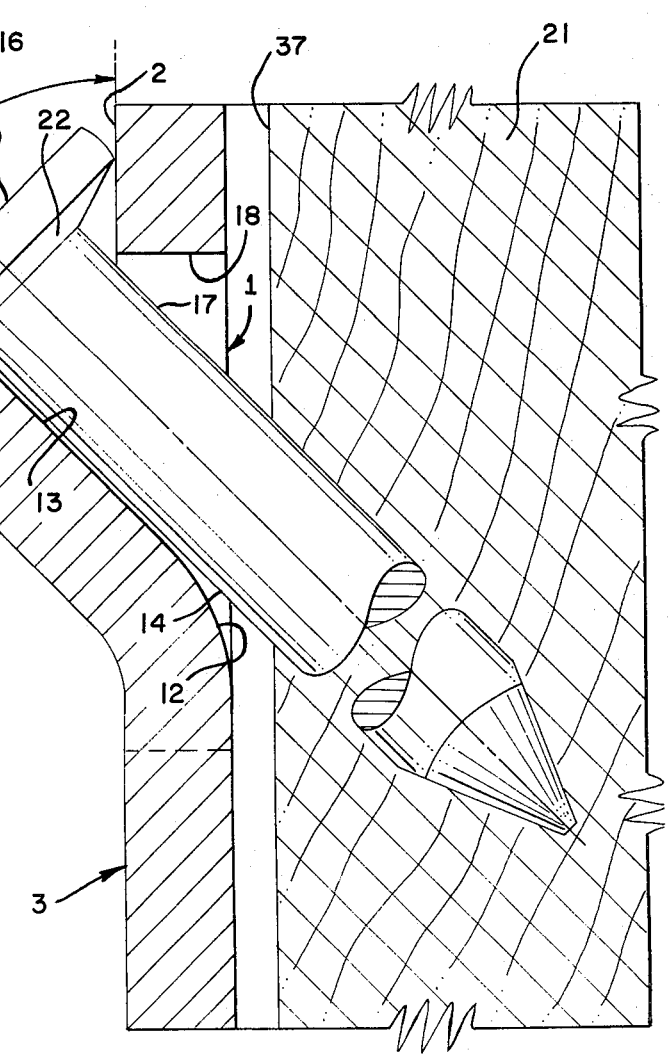
FIG. 3
FIG. 4
FIG. 5
FIG. 6

POSITIVE NAIL ANGLING DEVICE FOR METAL CONNECTORS

BACKGROUND OF THE INVENTION

The need for a positive nail-angling device for metal connectors used for connecting wood members exists in two separate areas. Namely; (1) prevention of wood splitting due to wood shrinkage and (2) prevention of splitting of laminated wood members such as plywood, glued laminated timbers (gluman) and prefabricated wood joists (microlams). While the solution is the same for both problems, the problems are so diverse that they will be discussed separately.

MOISTURE AND SHRINKAGE

The problem of connecting wood members with a metal connector requires a brief review of the characteristic of wood to shrink or expand depending upon the change in moisture content.

When a living tree as shown in FIG. 9 is cut, more than half of its weight may be moisture. Before wood can be used commercially, a large part of the moisture must be removed. Wood begins to shrink when the moisture content is reduced below a condition called the "fiber saturation point". For most woods, this is about 30%. For a 1% moisture loss below the fiber saturation point, the wood will shrink about one thirtieth (1/30th) in size. If dried to 15% moisture content, the wood will have been reduced by about one-half ($\frac{1}{2}$) of the total shrinkage possible. Wood shrinks most along the direction of the annual rings (tangentially) and about one-half ($\frac{1}{2}$) as much across these rings. Typical shrinkage is shown by lumber members 10, 20, 25 and 59 shown in FIG. 9. Ideally, a wood structure should be framed with lumber at a moisture content equal to that which it will obtain in service. This is not practical, however; since lumber with such a low moisture content is seldom available and would likely gain moisture during the construction stages. Standard practice is to use lumber with a moisture content in the range of 15% to 19%. In heated structures, it will eventually reach a level of about 8%.

METAL CONNECTORS

This application relates to the problem of nailing wood members which change in size to metal connectors which of course do not change in size.

The general state of the existing art is to simply provide a round hole in the side of the metal connector. This, of course, provides nail penetration into the wood which is essentially at 90° in respect to the plane of the connector device and the face of the wood member. In small dimension wood members there is little problem.

Orthogonal nailing of heavy structural hangers connected to the ends of supported glulams and solid wood beams, however, is a major problem because of wood splitting in the following manner.

BEAM HANGING

When glulams and heavy solid beams are attached to supporting beams by metal connectors, the main support is provided by the seat of the hanger. Shrinkage of the glulam or solid beam due to loss of moisture tends to raise the wood beam above the hanger seat and to "hang" the supported beam upon the side nails. When additional weight is imposed upon the hanging wood beam it is forced downwardly and moves back upon the seat. The orthogonally driven nails, however, try to hold the beam to the sides of the hanger and splitting of the beam occurs at the nail planes. This is a very serious problem and can result in beam failure unless costly repairs are made soon after splitting occurs or before heavy loading is imposed upon the beams hanging on the side nails above the hanger seat.

The problem of beam splitting due to orthogonal nailing has been known for some time. What has evaded those skilled in the metal connector arts is how to design a metal connector which is not prohibitively expensive which requires that the nail only be driven at a preselected angle.

Even though hangers for holding wood joists have been in existence for over eighty (80) years, none of these patents even recognize that a problem exists; let along suggest a solution. Van Dorn, U.S. Pat. No. 537,505 Wrought metal joist hanger, granted Apr. 16, 1895 teaches a metal hanger with a seat for holding wood joist members. No holes were provided in the sides of the hanger to prevent uplift of the beam.

Eberhardt, U.S. Pat. No. 753,053, granted Feb. 23, 1904, teaches a joist hanger with a seat and side members with round openings for the purpose of inserting nails through the side of the hanger orthogonally to the wood beam. No means is provided for permitting the side nails to be driven at an angle.

Findleton, U.S. Pat. No. 3,036,347, granted May 29, 1962, is an example of a more recent joist hanger. Again, nails are driven through the side of the hanger orthogonally to the held joist member. No provision is provided for driving nails into the side of the joist member at an angle.

Gilb, U.S. Pat. No. 3,601,428, granted Aug. 24, 1971, teaches the use of integral prongs formed in the side of the joist hanger. The prongs, penetrate the joist orthogonally. No provision is made for the prongs or nails to enter the joist at an angle.

Gilb, U.S. Pat. No. 4,005,942, granted Feb. 1, 1977, teaches a special hanger with slots in the sides of the hanger. Nails must be driven at a pre-selected angle through the slot due to the configuration of the different sides of the hanger. Even though the nails are driven at an angle splitting may still occur due to the hanging of the beam above the seat as shrinkage occurs.

While a slot will permit nail angling and even obviate splitting they are not generally permitted in standard hangers. The reason is fairly obvious, the function of the nails is to provide positioning restraint along the axis of the supported glulam or solid beam as well as to provide nominal uplift resistance, preventing the glulam or solid beam from moving upward and away from its seat support when uplift forces are present due to wind loads or seismic loads that can be imposed upon the structure. The usual design load for this requirement is between $\frac{1}{8}$ and 1/6th of the load provided by the seat for normal loading purposes. If the slot is oriented vertically and the nail is located in the center of the slot, it can not provide uplift resistance. If the nail is located in the bottom of the slot or the top of the slot itself, it still creates the splitting phenomenon in respect to any shrinkage force in that direction of the slot. Further, if it is located in the top of the slot and shrinkage does occur then the movement of the nail in the slot removes it from any position wherein it has any value as an uplift resistent element. All of this has the further complication of lacking any self-informing or enforcing any particular position of the nail in any specified portion of the slot and/or at any angle through the slot.

In spite of the extreme pressure for solving the splitting problem which has been known for many years, no practical solution has been devised to date. There has been some attempt to use elaborate solutions such as an angular drilled insert requiring the nail to follow the alignment of such drilled hole, but such solutions are totally impractical for production and cost reasons. The potentially direct solution; namely, drilling an angular hole into the material, is an impossibility in respect to the usual punch press technology involved. It is not cost effective or practical as a machine operation as any one has tried to drill a piece of sheet metal at an angle certainly knows, nor even, if accomplished due to the relative thinness of the material, would really keep the nail in natural angular alignment.

(2) LAMINATED WOOD STRUCTURES

A separate but related problem is in cases created by the use of metal hangers and clips with products such as plywood, glulams and microlams. In general, nailing into the edge of such plywood or plywood-like products is not permitted by building codes, nor can it be accomplished as a practical matter due to the usually certain result of splitting along the glued line at the point of nail penetration. Such splitting is common knowledge. Even though plywood is a very old product, reportedly first used by Michael Thonet, a cabinet maker of Bappard-am-Rhein in a plywood seat in 1874, there is no known inexpensive sheet metal positive nail angling device used to insure angular nailing into plywood.

In the particular case of a more recent sophisticated beam, such as, the microlam produced by Truss Joist Corporation wherein the ply lams are all grain oriented in the same direction for structural strength reasons, the splitting phenomenon is substantially accentuated to the point that side nailing parallel to the glue line for attaching any thing to such products is absolutely prohibited. To date, this has inhibited practical use of such products since attachment between such products and their necessary metal connectors may only be accomplished by nailing perpendicularly through the laminations. This has the effect of limiting design solutions to 50% of the available laminar planes when such manufactured structural members require attachment to metal connectors, hangers or similar devices. Any nailing solution for this condition includes the requirement that the nailing absolutely can not be installed parallel to the glued lines.

SUMMARY OF THE INVENTION

The solution set forth in this application to the vexing problem of wood splitting requires relatively little modification of existing hangers as opposed to the complex and expensive solutions previously pursued.

A slot-like opening is made in the face of the metal connector, but instead of removing any of the metal, the material across what would be one end of the slot remains attached and provides the bend line for the displaced material. The material is usually bent along the bend line at approximately a 45° angle in respect to the face of the metal connector. Such opening will then receive a nail at only one pre-selected angle in relation to the plane of the connector; usually at about 45°. Under no circumstances can the nail be driven in perpendicular to the plane of the connector.

The use of this positive nail-angling device effectively solves all of the above stated problems with respect to laminated wood members.

In respect to the general problem of beams splitting due to "hanging" on the supporting nails rather than being supported by the hanger seat when shrinkage occurs, providing side nailing at approximately a 45° angle in respect to the side of the connector provides a nail connection that still accomplishes all of the required code and engineering requirements such as horizontal positional restraint and uplift restraint but due to its downward angle accommodates any shrinkage of the supported member by permitting the shrinkage member to slip in withdrawal in respect to the downwardly angled nail. This phenomenon has been tested on typical heavy structural hangers using all nails between sixteen d and sixty d, as might be used for such application and found to, in fact, react as the above described.

In addition, there is a secondary advantage to the angular nailing so that even in the case of a solid member, any tendency for the nail to split the wood is decreased because such slip line by definition would be at the hypotenuse dimension of the perpendicular angle formed by a nail installed in a normal manner with such increase in dimension creating anti-split values proportional to such a length of a split plane. Further, in the specific case of manufactured timber such as glulams, such an angularly disposed nail is no longer parallel to the glue lines or the typical grain lines of such members, and in any event due to its length usually passes through two or more such glulam elements, each having different grain lines. Finally, the use of the present positive-nailing device permits nailing into the side of plywood-like members and specific products of a like nature, such as microlam, because the penetration angle of the nail, as absolutely restricted by the described invention, can not enter such a member parallel to the glue planes. As it enters such members at approximately a 45° angle it penetrates a multiple number of such laminations each having different grain lines. In applications where slippage provisions is not usually a requirement, alternate reversed use of the device in a connector product, such as a clip angle wherein two or more nails are to be used, permits the use of the connector device without resort to special devices that must avoid nailing entry parallel to the glue planes.

BRIEF DESCRIPTION OF THE DRAWINGS

FIG. 1 is a perspective view of one form of metal hanger which incorporates the positive nail angling device of the present invention. The hanger is shown connected to a carrying wood member and the hanger is supporting a carried wood beam member; both shown in phantom line.

FIG. 2 shows a standard metal hanger using standard orthogonal nailing. The hanger is shown attached to a carrying member and a carried solid beam; both shown in phantom line. The carried beam has split at the side nails due to shrinkage of the beam as explained in the background of the invention.

FIG. 3 is an enlargement of a portion of the hanger showing the positive nail angling device of the present invention. FIG. 4 is a cross sectional view of the hanger of FIG. 1 taken generally along line 4—4.

FIG. 5 is a still greater enlargement of the positive nail angling device of the present invention taken in the area of line 5—5 of FIG. 3.

FIG. 6 is a cross sectional view of the positive nail angling device of the present invention taken along line 6—6 of FIG. 5.

FIG. 10 is a side view of still another form of the positive nail angling device of the present invention.

DESCRIPTION OF THE PREFERRED FORMS OF THE INVENTION

Figure 7:
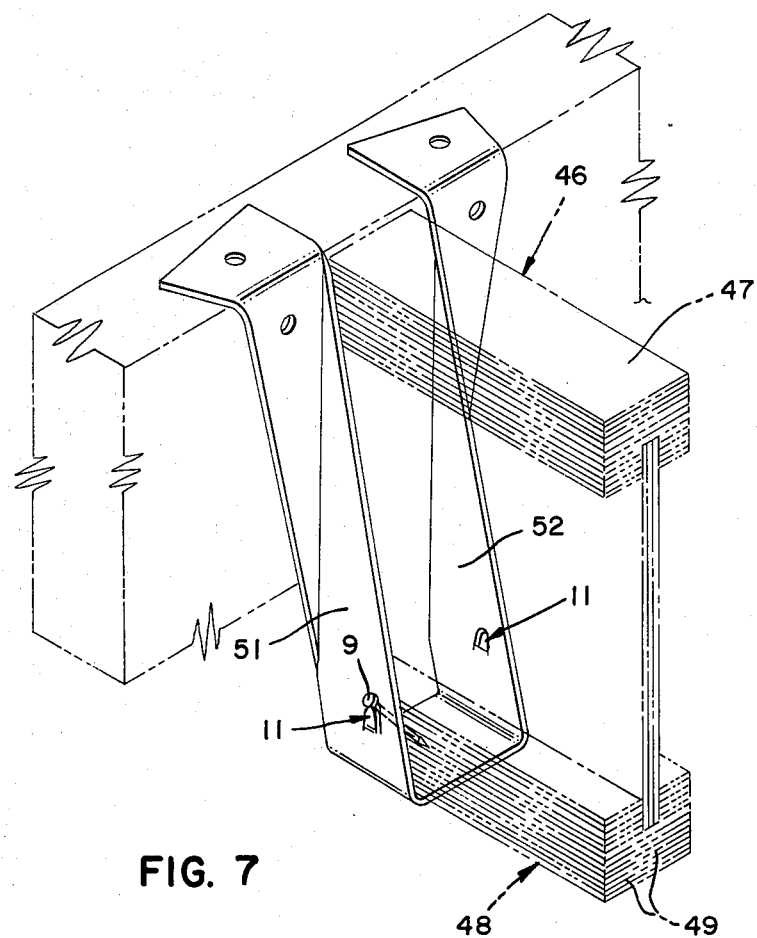
FIG. 7 is a perspective view of another hanger supporting a microlam beam and showing another use of the positive nail angling device of the present invention.

Referring to FIGS. 3, 4, 5 and 6, the positive nail-angling device consists of a slot-like opening 1 formed in a face 2 of a metal connector 3. The opening has a length greater than its width wherein the width is selected so that sides 4 and 5 of th slot register with opposite side edges 7 and 8 of nail 9. A tab-like member 11 is formed from the displaced face material from the slot-like opening 1 and bent along a bend line 12 which constitutes one end of the slot-like opening. The tab-like member is formed with a nail receiving surface 13 for positively receiving a side edge 14 of nail 9 in generally parallel face to face relationship. The length of the slot-like opening is selected to receive the nail at a selected angle 16 in relation to the face 2 of the metal connector so that one side 17 of the shank of the nail is in touching or close fitting relation to one end 18 of the slot-like opening and the opposite side 14 of the nail shank is in touching or close fitting relation to the nail receiving surface 13 of the tab-like member 11.

As shown in FIG. 5, the tab-like member 11 may be formed with curvature about its longitudinal axis 15 forming a cup-like protrusion. This adds further stiffness to resist pending as the nail is hammered into the slot-like opening. With the positive nail angling device as shown in FIGS. 3, 4, 5 and 6, the nail 9 can only be driven at the specific angle 16 in relation to the side of the hanger. The nail 9 is placed in the slot-like opening and hammered into the held beam 21 until the under surface 22 of the head 23 of the nail 9 comes in contact with edge 24 of the tab-like member and face 2 of the metal connector 3.

FIGS. 1 and 2 illustrate identical hangers 3 and 3' except for the fact that the hanger 3 shown in FIG. 1 includes the positive nail angling device of the present invention. The hanger is connected to carrying wood member 26 by inserting nails through standard round openings 27 in the top flanges 28 and 29 and side members 31 and 32. The bottom edge 33 of carried member 21 rests upon seat 34. The positive nail angling devices 6 as previously described are formed in the side members 40 and 50 of the hanger. Nails 9 are driven at an angle of approximately 45° to a plane 53 which is along the longitudinal axis 36 of the carried beam and parallel to the side faces 37 and 38 of the carried member. The nail is driven in a direction generally opposite to the direction of the load force which is to be opposed. In the case of the hangers shown in FIGS. 1 and 2, the force to be opposed is an upward force shown by arrow 39 which could be caused by earthquakes or cantilevering forces applied to the opposite end of the carried beam 21. The nails also resist beam withdrawal forces represented by the arrow 41. These withdrawal forces tend to withdraw the beam from its seat 34.

The hanger 31 shown in FIG. 2 is representative of the hundreds of different forms of hangers which use standard round openings 27 and orthogonal nailing to attach the sides 40' ad 50' of the hanger to the carried member 21'. The lower edge 33' of the held member 21' initially rests in seat 34'. As previously explained, if shrinkage of beam 21' occurs and it lifts off seat 34', the load is now carried by side nails 9. If load is reimposed upon carried member 21', the carried beam will split at the nails 9 along split lines 42. The load carrying ability of a beam is seriously impaired when it is split as shown in FIG. 2. A position of normal or greater than normal loads can result in failure of the beam and that portion of the building structure.

In an attempt to minimize the splitting problem illustrated in FIG. 2 in very large beams having a depth of 30" or more, it has been the practice of connector manufacturers to locate the nail openings in the lower portion of the side members as close to the seat as possible. This practice while alleviating the splitting problem somewhat, creates a building construction problem. Since the nailing of the beams to the hangers is done by a carpenter standing on the carrying member, he must reach downwardly from the top and with both hands set and then hammer the nail into the beam. As may be surmised, in a beam of over 30", a workman sometimes must lie completely prone in order to reach the lower nails. In many jurisdictions such nailing procedures are prohibited by OSHA regulations on the grounds that they are unsafe for construction personnel.

The major benefit of the present invention is that since the splitting problem is almost entirely eliminated by the use of the positive nail angling, the positive nail angling devices of the present invention may be located near the top of the hanger as shown in FIG. 10. This has resulted in a safer installation procedure for the workmen since they can easily reach all of the nail openings in the hanger.

Since hammering of the nails is accomplished from a position above the hanger, it can be difficult to strike the nail if the nail is hammered into the beam on a plane at right angles to the plane of the face of the hanger. For this reason, as shown in FIG. 10, the tab member 11 and its axis 44 in addition to being set at a 45° angle with respect to the face 45 of the hanger are set at an angle 43 of about 45° to the vertical axis 35 of the held beam 21'. The nail angle could be set either toward or away from the carrying beam 26' but for ease in driving the nail, it is preferable for the nail to be driven towards the carrying member 26'.

The hanger shown in FIG. 7 carries a microlam beam 46 in which the top and bottom chord members 47 and 48 are constructed from a plurality of laminar members 49 which are glued at their abutting faces. Driving nails orthogonally into the side of the top and bottom chord members is absolutely prohibited because the nail will cause the chords to split. On the other hand, nails can be driven at an angle into the chord members. Prior to the present invention, the usage of the microlam beams was severely limited because standard hangers could not be used. The use of the positive nail angling device, for the first time, permits the microlam beams to be used with hangers as shown in FIG. 7. The positive nail angling device is the same as shown in previous FIGS. 3 through 6. The tab-like member 11 is shown located on side members 51 and 52.

Figure 8:
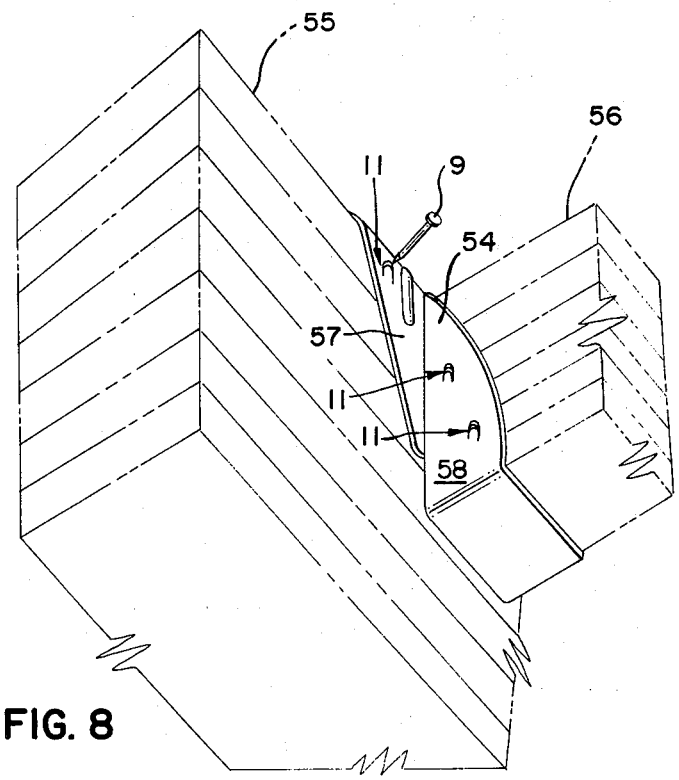
FIG. 8 is a perspective view of a metal hanger connected to a glulam member and showing still another use of the positive nail angling device of the present invention.
Figure 9:
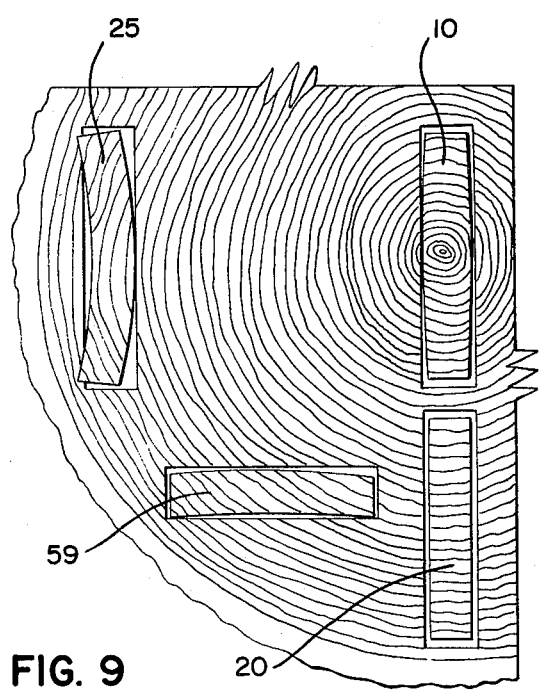
FIG. 9 is a partial cross section of a tree showing the characteristic shrinkage and distortion of lumber as affected by the direction of annular growth rings.

FIG. 8 illustrates still another major use of the positive nail angling device of the present invention. Hanger 54 is attached to a glulam carrying member 55 and carries either a solid or glulam beam 56. As previously stated, if nails are driven orthogonally into the face of glulam members at a point which is on or near the glued faces, splitting is likely to occur. With the present invention, positive nail angling devices with tab-like members 11 which are identical to the previously described angling devices are provided on both the side flange 57 which is attached to the carrying member 55 and in the side members 58 which are attached to the carried glulam 56. Since glulams also shrink in the width dimension as indicated by board 59 shown in FIG. 9, the problem of "hanging" as previously described is also a problem because of the tendency to split along the plane of nail penetration. Since the nail often penetrates more than one glulam member when angled at 45° there is less tendency to split.

I claim:

1. A positive nail-angling device for positioning a nail with respect to the face of a metal connector and a structural wood member only at a preselected angle which is substantially less than 90° comprising:
   a. said metal connector is a metal hanger having parallel side members and a seat for holding a held wood member in relation to an attachment member;
   b. said positive nail angling device is formed in one or more of said sides of said metal hanger;
   c. a slot-like opening formed in a face of said connector having a length greater than its width wherein said width is selected to register with the sides of said nails;
   d. a tab-like member formed from the displaced face material from said slot-opening and bent along a bend line which constitutes one end of said slot-like opening;
   e. said tab-like member is formed with a nail receiving surface for positively receiving a side of said nail in generally parallel, face-to-face relationship; and
   f. the length of said slot-like opening is selected to receive said nail only at a pre-selected angle in relation to the face of said metal connector so that one side of the shank of said nail is in touching or close fitting relation to one end of said slot-like opening and the opposite side of said nail shank is in touching or close fitting relation to said nail receiving surface of said tab-like member.

2. A device as described in claim 1 wherein;
   a. said tab-like member is formed with curvature about its longitudinal axis to stiffen the tab-like member.

3. A device as described in claim 1 wherein:
   a. said tab-like member forms an angle of about 45° with respect to said face of said connector.

4. A device as described in claim 3 for positioning a nail with respect to a metal hanger and a held structural wood member having a vertical axis comprising:
   a. said tab-like member forms an angle of about 45° with respect to said vertical axis of said held structural member.

* * * * *